United States Patent [19]
Creighton

[11] Patent Number: 5,346,127
[45] Date of Patent: Sep. 13, 1994

[54] AIR CONDITIONING SYSTEM WITH ENHANCED DEHUMIDIFICATION FEATURE

[75] Inventor: Peter G. Creighton, Fort Lauderdale, Fla.

[73] Assignee: Creighton and Associates, Inc., Ft. Lauderdale, Fla.

[21] Appl. No.: 136,347

[22] Filed: Oct. 14, 1993

[51] Int. Cl.$^5$ ............................................ G05D 23/13
[52] U.S. Cl. ........................................ 236/13; 165/16; 165/36; 236/49.3
[58] Field of Search ................... 236/13, 49.3; 165/16, 165/35, 36

[56] References Cited

U.S. PATENT DOCUMENTS

| | | | |
|---|---|---|---|
| 2,212,356 | 8/1940 | Shure | 62/129 |
| 2,236,190 | 3/1941 | Wolfert | 165/35 X |
| 2,306,463 | 12/1942 | Newton | 62/8 |
| 2,338,382 | 1/1944 | Marlow | 257/3 |
| 2,432,587 | 5/1947 | Ramsey | 62/6 |
| 2,540,957 | 2/1951 | Newton | 62/129 |
| 2,604,763 | 7/1952 | Lipman | 62/129 |
| 2,711,086 | 6/1955 | Eilers | 62/129 |
| 2,824,429 | 2/1958 | Zucker | 62/129 |
| 2,959,036 | 11/1960 | Mehalick | 62/427 |
| 3,927,713 | 12/1975 | Gilles | 165/16 |
| 3,960,527 | 6/1976 | Goetti | 55/269 |
| 4,281,522 | 8/1981 | Bussjager | 62/409 |
| 4,362,026 | 12/1982 | Miller | 165/16 X |
| 4,437,608 | 3/1984 | Smith | 236/13 |
| 4,605,160 | 8/1986 | Day | 236/13 |
| 5,244,035 | 9/1993 | Iida et al. | 236/13 X |
| 5,267,451 | 12/1993 | Cleveland | 165/36 X |

Primary Examiner—William E. Tapolcai

[57] ABSTRACT

An air conditioning system is provided with indoor and outdoor air. Since the moisture content of the outdoor air is the major factor in determining the resulting humidity of the indoor space to which conditioned air is supplied, outdoor air is cooled to the greatest extent consistent with the total air cooling needed, before cooling is applied to the indoor air. Cooling is provided by a heat exchanger, through which a cooling medium, such as chilled water or a refrigerant, is circulated. Indoor air not cooled by passing through the heat exchanger is directed, by means of a face and bypass damper, through a bypass duct extending around the heat exchanger from an input mixing plenum at the input to the heat exchanger to an output mixing plenum at the output of the heat exchanger. In a first version, a second face and bypass damper is provided to direct air from the input mixing plenum to pass through the heat exchanger or through the bypass duct. In a second version, this second face and bypass damper is replaced by a valve controlling the flow of the cooling medium through the heat exchanger. Each of these methods provides a way to control the rate of cooling provided to air flowing through the input mixing plenum, which is used to control relatively low rates of overall cooling. Relatively high rates of overall cooling are achieved and controlled by adding a flow of indoor air into the first mixing plenum.

28 Claims, 8 Drawing Sheets

AIR CONDITIONING SYSTEM WITH ENHANCED DEHUMIDIFICATION FEATURE

BACKGROUND OF THE INVENTION

Field of the Invention

This invention relates to controlling the humidity within an interior space, and more particularly, to maximizing the reduction of humidity achieved by an air cooling process using a combination of outdoor and recirculating indoor air.

Background Information

Air conditioning systems for commercial structures typically mix outdoor air with recirculating indoor air before heating or cooling the resulting mixture. This mixing process is necessary to prevent deterioration of the air quality within the building. The relative volume of outdoor air which must be added during the air conditioning process depends generally on the use of the indoor space.

Recent changes in indoor air quality standards have greatly increased the ratio of outdoor air to indoor air circulating in the system in a large number of commercial applications. While, in the past, ten to fifteen percent of the air circulating through a typical system came from outdoors, the relative volume of outdoor air which must be added to indoor air has greatly increased in many typical applications. Often, forty to seventy percent of the air brought into an air conditioning system is from outdoors.

A commercial air conditioning system typically uses chilled water or a circulating refrigerant to cool air before it is forced into an indoor space. The air handling portion of the system includes a filter, through which air is drawn into a face and bypass damper section, which directs all or part of the air through one or more cooling coil(s), while the remainder of the air is directed around the coil(s). When maximum cooling is required, all of the air is directed through the coil(s). When no cooling is required, all of the air is directed around the coil(s). With this approach, the rate of cooling provided within the air handling system can be varied in a precise and smooth fashion without changing the temperature or flow rate of chilled water through the cooling coil(s).

The rate of cooling provided by a system of this kind is typically varied in response to a thermostat placed within the indoor space being cooled, with variations occurring in a smooth manner to maintain a chosen temperature level at the thermostat. That is, the air conditioning system does not turn on and off in response to changes in temperature measured at the thermostat; rather the operation of the air conditioning is varied to change the difference between the temperature at which air is discharged by the air conditioning system and the temperature within the interior space, as measured by the thermostat. This temperature difference is increased to handle an increase in air conditioning load, which may be caused, for example, by additional people moving into the indoor space or by sunlight being directed into the space.

When this type of system is used to cool a mixture of indoor and outdoor air, the mixing process occurs before the cooling is achieved. That is, the indoor and outdoor air is mixed together before reaching the filter section and before a cooling process is applied to the resulting mixture.

Description of the Prior Art

U.S. Pat. No. 2,432,587 to Ramsey describes a relatively large type of air conditioning system in which control of the rate of cooling is established by varying the operation of refrigerant compressors and by varying the relative flow of recirculating air between a path through the direct expansion unit of the refrigerant process, where the air is cooled, and a path bypassing this expansion unit. The refrigerant process is varied, for example, by varying the number of operating compressors in response to a thermostat. The bypass air path and the air path through the expansion unit meet in a chamber forming the input to a fan blowing the resulting air mixture into the interior space being cooled. The proportion of air flowing through the bypass air path is vaned by controlling a first damper extending across the outlet of the bypass air path, together with a second damper extending across the input side of the expansion unit. This control is arranged so that, in response to a thermostat placed at the output of the expansion unit, the first damper is closed as the second damper is opened. Outdoor air is also supplied into the system, being mixed with recirculating indoor air before the resulting mixture is drawn through the expansion unit.

Controlling the cooling rate by means of dampers positioned and moved as described by Ramsey poses a particular problem in that the amount of outdoor air brought into the system is increased and decreased as the dampers are adjusted in response to the temperature measured at the outlet side of the expansion unit. As more air is directed to flow through the bypass path, less outdoor air is brought into the system,. However, in many applications, a fixed ratio of outdoor air to recirculating indoor air must be moved through the system, regardless of the cooling requirements. This ratio is often determined by law or municipal code, depending, for example on the usage of the indoor space being cooled and its actual or maximum expected occupancy, regardless of the air conditioning load. What is needed is a means for varying the proportion of air drawn through the expansion unit without simultaneously varying the flow of outdoor air used for ventilation.

U.S. Pat. No. 2,338,382 to Marlow describes an air conditioning system in which the temperature and humidity of an indoor space are controlled in response to the operation of a thermostat and a humidistat. Air cooling is provided through the use of an evaporator in a refrigerant system, while heating is provided by a steam preheater, through which outdoor air is drawn for ventilation, and by a reheater through which air exiting the evaporator is drawn. Humidity is increased by spraying water into the air before it enters the evaporator, or decreased by cooling the air as it passes through the evaporator. As in the system of Ramsey, a bypass path is provided to direct air from the duct through which it is returned to the system from the indoor space, to the input of the fan used to force air from the system back into the indoor space. This bypass air does not pass through the various air conditioning elements, such as heaters or the evaporator. The flow of air through the bypass path is controlled by dampers in the bypass and main air paths, with these dampers being operated in turn in response to a thermostat. Also as in the system of Ramsey, the outdoor air is mixed with recirculating indoor air before the resulting mixture is drawn through the evaporator.

Thus, the system of Marlow, like that of Ramsey, does not supply a constant volume or proportion of outdoor air for ventilation as dampers are adjusted to vary the flow of air through a bypass air path. Again, what is needed is a way to vary the proportions of air drawn through the bypass path and through the evaporator without changing the proportion of outdoor air supplied for ventilation.

U.S. Pat. No. 2,540,957 to Newton describes a room air conditioner in which a refrigeration system has two cooling coils, one of which cools outdoor air supplied to the system, while the other coil, which is maintained at a relatively lower temperature, cools the recirculating room air. The latter coil, if desired, may also cool the incoming (outside) air. Newton indicates that a maximum dehumidification of the air being cooled is obtained with a minimum volume of refrigerant, stating that it has been found by experience that dehumidification does not occur unless there is about a 30 degree temperature differential between the temperature of the refrigerant in the system and the temperature of the air being cooled by the system. In this regard, the advantage claimed for the Newton system arises from the fact that it can provide a two-stage cooling process in which the outside air is cooled first by one coil, and then, after it is mixed with the recirculating air, by the other coil. Newton indicates that this method allows the 30 degree differential to be established between the air being cooled by each coil and the refrigerant in each coil. In a preferred configuration, the upstream cooling coil, used to cool the outdoor air, discharges refrigerant into the compressor at a location between the limits of piston travel, while the downstream cooling coil discharges into the compressor through the usual suction valve located in the head of the compressor cylinder. Newton further describes a room air conditioner in which the dehumidification of air is increased by circulating a portion of the air back through the system to make a plurality of passes over the cooling coils before being discharged into the room.

Thus, while Newton teaches increasing the effectiveness of dehumidification by having a portion of the air move past cooling coils two or more times, he does not anticipate using a single cooling stage to cool the portion of the air having the most moisture to the maximum extent consistent with cooling and ventilation requirements. What is further needed is an air conditioning system in which all of the cooling effort is applied, whenever possible, to the portion of the air carrying the moisture into the system. In many cooling applications where humidity is a problem, the outdoor air used for ventilation is the portion carrying the most moisture into the system.

U.S. Pat. No. 4,281,522 to Bussjager describes a commercial type of air conditioning unit configured for using a relatively high volume of outdoor air. The outdoor air is preconditioned by cooling, or heating if required, before it is mixed within the unit with recirculating indoor air. The preconditioning unit has a vapor compression refrigeration circuit which is separate from the vapor compression refrigeration circuit of the main portion of the air conditioning unit, which handles a mixture of indoor and outdoor air. This process allows the main portion of the air conditioning unit, which handles the mixture of indoor and outdoor air, to operate in an efficient range despite extreme temperature variations in outdoor air. Furthermore, the capacity of the main portion of the air conditioning unit does not need to be increased due to such variations.

Thus, like Newton, Bussjager advocates the pretreatment of outdoor air brought into an air conditioning system. Also like Newton, Bussjager applies a standard cooling process to the indoor air recirculating through the system. For typical conditions of high outdoor humidity, together with a requirement to provide a relatively large volume of outdoor air for ventilation, what is needed is means to apply as much cooling is possible, consistent with cooling requirements, to the outdoor air being brought into the system.

U.S. Pat. No. 2,959,036 to Mehalick describes an air conditioning unit in which a particular method is used to cool outdoor air blown through the system. Recirculating indoor air is cooled by means of a heat exchanger constructed in the conventional way, including a series of parallel runs of tubing connected by return bends, so that effective heat transfer occurs by means of a series of parallel fin plates extending among the tubing. The return bends are generally not in the path of the flow of recirculating air. A special duct is provided to direct outdoor air introduced for ventilation over some of the return bends. The heat exchanger is described as part of a closed vapor-cycle refrigeration process, such as the evaporator. Thus, the recirculating indoor air and the outdoor ventilation air pass through the heat exchanger in separate, parallel paths, to be exhausted into the indoor space.

While the Mehalick invention provides an advantage of utilizing the otherwise unused surfaces of the return bends of tubing at the ends of the heat exchanger, the cooling which can be applied to the outdoor air being directed into the room for ventilation is quite limited. Most of the cooling occurs in the central finned portion of the heat exchanger, through which recirculating indoor air is blown. For high humidity applications using relatively high proportions of outdoor air, what is needed is a means for allowing much more effective cooling of the outdoor air being brought through the system, together with means for reducing or eliminating the cooling of recirculating indoor air, as required to achieve maximum dehumidification in a manner consistent with cooling requirements.

A number of U.S. Pat. Nos. such as 2,604,763 to Lipman, 2,711,086 to Eilers, and 2,824,429 to Zucker, describe various ways to provide for or control the mixing of outdoor air with recirculating indoor air, before the resulting mixture is cooled during an air conditioning process based on the compression, circulation, and evaporation of a refrigerant. Since the devices described in these patents control the rate of cooling provided by varying the operation of the refrigerant cycle, these devices do not include an air path bypassing the heat exchanger where air cooling occurs, i.e. the evaporator in this type of unit. Specifically, most of these devices are small units which are turned off and on in response to a thermostat.

While such systems may be quite adequate for their intended applications, such as cooling the air of a room in a home, they lack features providing for the constant flow of a predetermined mixture of outdoor and recirculating indoor air. They are thus not appropriate for a number of commercial applications in which such an airflow must be arranged regardless of the need, if any, for cooling.

SUMMARY OF THE INVENTION

In accordance with one aspect of the invention, there is provided an air conditioning system including a return duct extending to a source of indoor air, a ventilation duct extending to a source of outdoor air, an input plenum for mixing air from the return duct with air from the ventilation duct, cooling means for cooling air from the input mixing plenum, a bypass duct extending around the bypass duct from the indoor air supply duct, an output mixing plenum for mixing air flowing from the cooling means with air flowing from the bypass duct, a supply duct through which air from the output mixing plenum is discharged, a fan for moving air from the return and ventilation ducts, through the cooling means and the bypass duct, to the supply duct, cooling regulation means controlling a rate at which heat is removed within the cooling means, and system control means for providing a variable overall rate of air cooling. To provide relatively low levels of the overall rate of air cooling, the system control means varies operation of the cooling regulation means while holding the first airflow regulation means in a state providing a minimum level of airflow through the cooling means. To provide relatively high levels of the overall rate of air cooling, the system control means varies operation of the first airflow regulation means while holding the cooling regulation means at a level providing maximum cooling.

BRIEF DESCRIPTION OF THE DRAWINGS

Preferred embodiments of the subject invention are hereafter described, with specific reference being made to the following Figures, in which.

DETAILED DESCRIPTION

Figure 1:
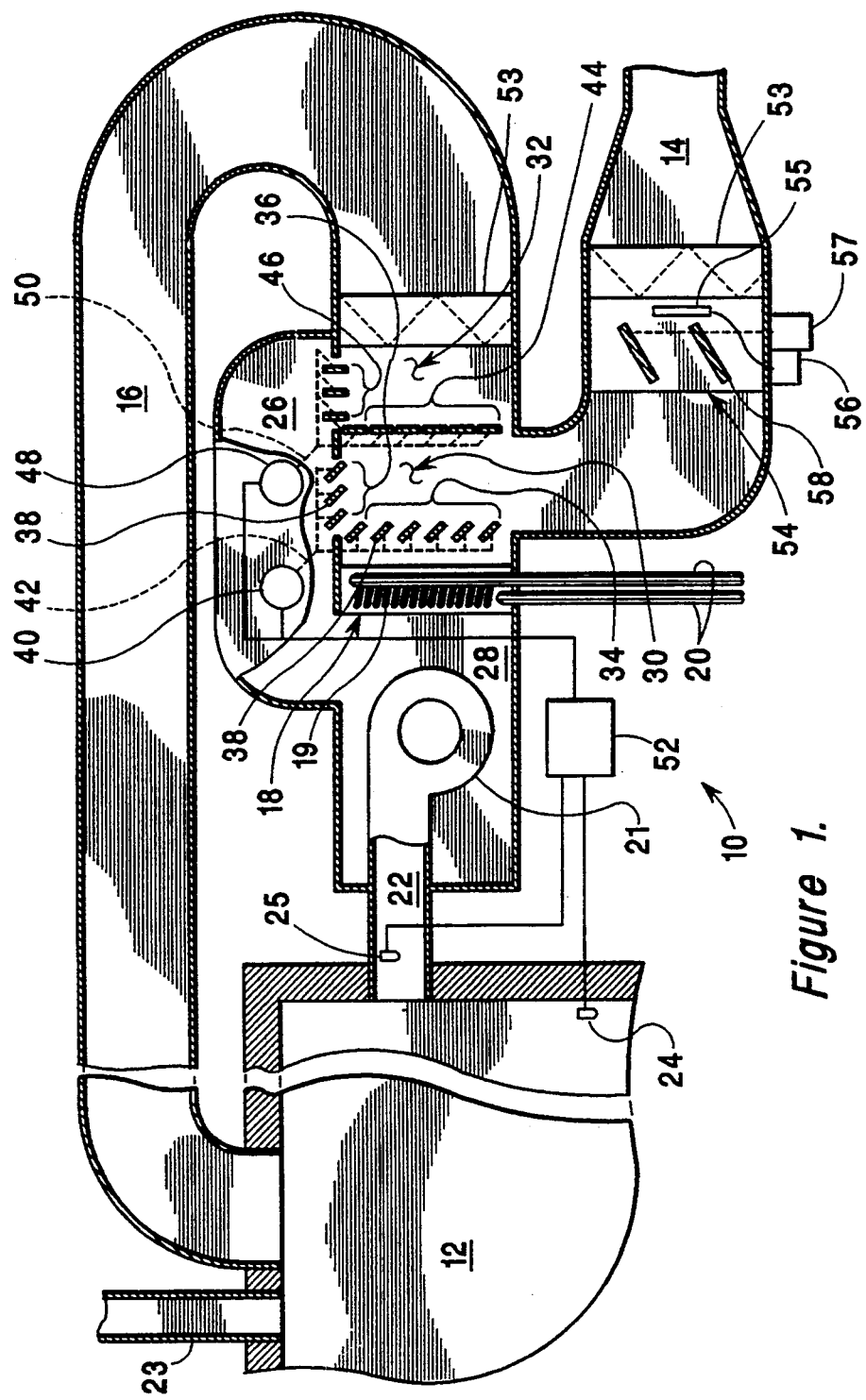
FIG. 1 is a sectional elevational view of an air conditioning system built in accordance with a first embodiment of the present invention.

Referring to FIG. 1, an air conditioning system, generally indicated as 10, cools an indoor space 12 by means of outdoor air drawn through a ventilation duct 14, or by means of a mixture of such outdoor air and indoor air. Indoor air is drawn through a return duct 16. This outdoor air, or mixture of outdoor and recirculating indoor air is drawn through a heat exchanger 18, in which a coolant is flowing.

Heat exchanger 18 may be of a conventional type, including one or more tubes formed into a number of straight, horizontal sections (not shown) connected by "U"-shaped sections 19 at the ends of the heat exchanger, and further including a number of parallel fins (not shown) extending among the tube sections, so that heat carried by air flowing between adjacent fins is exchanged with the coolant, to heat the coolant as the air is cooled. The coolant may be, for example, chilled water provided and pumped by conventional means through pipes 20 connected for circulation of the medium through heat exchanger 18.

System 10 also provides a dehumidifying function by lowering the temperature of air so that it holds less moisture. A ventilation function is provided by introducing outdoor air through duct 14 at a constant volummetric rate, regardless of the cooling requirements placed on system 10. Air is drawn through the system from both ventilation duct 14 and return duct 16, by means of a fan 21, which in turn supplies air from the system to indoor space 12 through a supply duct 22.

Air is allowed to exhaust from indoor space 12 through an exhaust port 23, which can assume many different forms, based on the ventilation requirements for the space 12 and on the structural characteristics of the building enclosing this space. In some applications, it may be adequate to rely on cracks in doorways, etc., to provide this function; in other applications it is necessary to make specific provisions for exhausting air. Such provisions may include the provision of exhaust ducts with dampers and even exhaust fans and roof-mounted turbines.

In a hot and humid climate, with an air conditioning system supplying significant fresh air ventilation, the major source of indoor humidity is moisture drawn in with the outdoor air. Through the application of the present invention to air conditioning system 10, the dehumidification of air supplied to the indoor space 12 is maximized by minimizing the temperature to which the outdoor air brought into the air conditioning system is cooled, so long as this temperature is consistent with cooling and ventilation requirements of the indoor space.

The ventilation requirements placed on a commercial air conditioning system are typically fixed, depending on various factors associated with the indoor space, such as the number of people expected to occupy the space. These requirements may, in fact be determined by local regulations in many applications. The total airflow, including recirculating indoor air, through a typical air conditioning system for this type of application is typically fixed as well, at a constant rate, so that the outdoor air required for ventilation may be expressed as a percentage of total airflow.

Control of the rate of cooling provided by air conditioning system 10 is achieved by varying the difference between the temperature of the air supplied by system 10 to indoor space 12, and the temperature within the indoor space itself, as measured by an appropriately placed indoor space thermostat 24. To maintain a chosen temperature at the location of thermostat 24, the magnitude of this temperature difference, which is called the "supply air temperature differential," is determined by the air conditioning load of the interior space. The supply air temperature is measured by means of a supply air thermostat 25 placed in supply duct 22. The air conditioning load is increased as more people enter the room, as sunlight is directed into the room, etc. Fortunately, the effects of such changes are typically felt slowly; even though drapes may be pulled quickly to let in sunlight, or a number of people may suddenly enter a room, the volume of air within the indoor space is large enough that temperature changes due to such variations in air conditioning load happen slowly.

Within air conditioning system 10, the rate of cooling is controlled by varying the volummetric rate of airflow through heat exchanger 18. This method for controlling the air conditioning process is especially useful when applied in an air conditioning system using chilled water instead of a compressible vapor as the coolant. Since the chilled water is maintained at a temperature somewhat above the freezing point of water, neither the coolant nor moisture carried by the air drawn through the heat exchanger can freeze as the rate of airflow through the heat exchanger is reduced.

Because of ventilation requirements, which exist separately from the cooling requirements placed on the system, a constant volume of air is moved through the system. The rate of airflow through heat exchanger 18 is varied by dividing the flow of air, so that some air flows through heat exchanger 18 while a remaining portion of the airflow is drawn through a bypass duct 26 around heat exchanger 18.

Fan 21 is located at a plenum chamber 28, through which air is easily dram from both heat exchanger 18 and bypass duct 26. In this way, it is both desirable and possible to maintain a constant flow rate of a coolant, such as chilled water, through heat exchanger 18. When no cooling is required to maintain the desired temperature in interior space 12, all of the air, from both ventilation duct 14 and return duct 16, is directed around heat exchanger 18 through bypass duct 26. When a maximum cooling effort is required to maintain this temperature in interior space 12, all of the air from ducts 14 and 16 is directed through heat exchanger 18.

The direction of outdoor airflow from ventilation duct 14 to heat exchanger 18 or to bypass duct 26 is accomplished through the use of a pair of face and bypass dampers 30 and 32. One of these, face and bypass damper 30, divides the flow of air between heat exchanger 18 and bypass duct 26, while the other of these, return duct face and bypass damper 32, divides the flow of indoor air between face and bypass damper 30 and bypass duct 26. Thus, face and bypass damper 30 also acts as a plenum chamber in which indoor and outdoor is mixed before the resulting mixture is drawn through the air path of heat exchanger 18. Face and bypass damper 30 incldes a face damper section 34, extending adjacent to the face of heat exchanger 18, and a bypass damper section 36, extending across an opening into bypass duct 26. Each damper section 34 or 36 includes a number of vanes 38, each of which may be moved between a fully closed position, blocking airflow, and a fully open position, permitting maximum airflow. Each vane 38 may also be held in any partly open position between fully open and fully closed positions. Within each section 34 or 36, the vanes 38 are preferably mechanically tied to move together from fully open and fully closed positions. Furthermore, a motor 40, by means of a mechanism 42, preferably opens vanes within face damper section 34 as vanes within bypass damper section 36 are closed.

Similarly, the direction of indoor air flow from return duct 16 to face and bypass damper 30 or to bypass duct 26 is controlled by return duct face and bypass damper 32. As the vanes of face damper section 44 are opened, and as the vanes of a bypass damper section 46 are closed, more recirculating air is allowed to flow into face and bypass damper 30, while less recirculating air is allowed to flow into bypass duct 26. With face damper section 44 partly or fully open, recirculating indoor air is mixed with outdoor air in outdoor face and bypass damper 30, which acts as a plenum chamber, before the resulting mixture of air is drawn through heat exchanger 18. Face damper section 44 is opened as bypass damper section 46 is closed by means of a motor 48 operating a vane drive mechanism 50.

Thus, face and bypass damper 30 handles outdoor air alone only when face damper section 44 is fully closed. At other times, face and bypass damper 30 acts as a mixing plenum on the input side of heat exchanger 18, handling a mixture of outdoor air and indoor air.

Motors 40 and 48 are controlled by a controller 52, which operates in response to temperatures measured at conditioned space thermostat 12 and supply air thermostat 25. The links between the thermostats 12 and 25 and controller may be pneumatic or electric control lines. The desired temperature is entered as an adjustment of conditioned space thermostat 12, providing a setpoint to which the temperature measured by the thermostat is compared. For example, indoor space thermostat 24 may provide an electrical voltage or a pneumatic pressure proportional to a difference between the temperature measured by the thermostat and the setpoint temperature. Similarly, motors 40 and 48 may be electrical types driven by electrical signals from controller 52, or pneumatic types driven by pneumatic signals from controller 52.

While data from conditioned space thermostat 24 provides an accurate measure of the temperature in the conditioned space, this temperature can be expected to change very slowly as the rate of cooling is changed. On the other hand, the temperature measured by supply air thermostat 25 can be expected to change quite rapidly as the rate of cooling is changed by opening or closing the damper sections in face and bypass dampers 30 and 32. Therefore, measurements from both thermostats are preferably used to provide a system which can respond rapidly and accurately to changes in air the conditioning load within interior space 12.

The rate of cooling may be controlled, for example, by regulating the flow of air through heat exchanger 18 to maintain a constant supply air temperature differential, i.e. a constant difference between the temperature measured by indoor space thermostat 24 and supply duct thermostat 25. Holding this temperature difference constant compensates for various changes not related to the air conditioning load of interior space 12. Such changes may be, for example, variations in the speed of fan 21 due to changes in electrical voltage, variations in the temperature of outdoor air introduced through ventilation duct 14, or variations in the temperature or rate of flow of coolant through heat exchanger 18.

However, variations in the air conditioning load of interior space 12 cause a change in the temperature measured by indoor space thermostat 24, which therefor transmits a signal indicating that the measured temperature is above or below the chosen setpoint. When this occurs, the supply air temperature to which the system will be controlled is changed by controller 52. For example, if the temperature measured by indoor space thermostat 24 increases above the setpoint, controller 52 operates in accordance with an assumption that the air conditioning load of interior space 12 has increased, so the temperature to which the air in supply duct 22 will be controlled is decreased. The supply air temperature may be decreased by increasing the flow of air through heat exchanger 18.

Air conditioning system 10 is preferably arranged so that maximum cooling is applied to outdoor air, being supplied from ventilation duct 14, as long as the cooling supplied to this air does not exceed the amount of cooling required to bring the temperature within indoor space 24 to the chosen temperature. To achieve this dehumidification advantage, input plenum face and bypass damper 30 and return duct face and bypass damper 32 are operated in sequence with indications of a need to vary the rate of cooling. If there is no need for cooling, i.e. if the temperature within indoor space 12 is at or below the setpoint temperature of thermostat 24, both bypass damper sections 36 and 46 are fully open, and both face damper sections 34 and 44 are fully closed. With the dampers in this configuration, all of the air, from both indoor and outdoor sources, is diverted to flow through bypass duct 26, so that cooling does not occur. As the need for cooling arises and is increased from this condition, the damper sections in face and bypass damper 30 are operated to allow an increasing flow of outdoor air through heat exchanger 18 while decreasing the flow of outdoor air through bypass duct 26. Whenever the signals supplied by thermostats 24 and 25 indicate that the required rate of cooling has been reached, the positions of damper sections 34 and 36 are retained, so that the rate of airflow through and around heat exchanger 18 remains constant.

The rate of cooling is increased in this way, with only outside air from ventilation duct 14 being drawn through heat exchanger 18, until face damper section 34 is fully open, while bypass damper section 36 is fully closed. At this point, additional increases in the rate of cooling cannot be achieved using outdoor air. If increases in this rate are required, they are obtained by opening face damper section 44 of return duct face and bypass damper 32, as bypass damper section 46 is closed. In this way, indoor air is drawn through heat exchanger 18, being mixed with outdoor air in face and bypass damper 30, which acts as a plenum chamber. If the signals supplied by thermostats 24 and 25 indicate that the required rate of cooling has been reached, the positions of damper sections 42 and 46 are maintained. A maximum rate of cooling consistent with ventilation requirements is achieved when face damper section 44 is fully open with bypass damper section 46 being fully closed.

Similarly, if the rate of cooling is decreased from an operating condition in which face damper section 44 of return duct face and bypass damper 32 is partly open, this section 44 is closed, as bypass damper section 46 is opened, before changes are made in the settings of input plenum and bypass damper 30. When face damper section 44 is fully closed, with bypass damper section 46 being fully open, the process of closing face damper section 34 while opening bypass damper section 36 to decrease the rate of cooling is begun. Again, if the signals from thermostats 24 and 25 indicate that a proper rate of cooling has been reached, movement of vanes within the damper sections is stopped.

Other elements of air conditioning system 10 include filters 53 to remove dust from air being drawn from both and ventilation duct 14 and return duct 16. Also, a variable air volume control (VAV) unit 54 is provided within the path of outdoor air being drawn from ventilation duct 14. This VAV unit 54 includes an air velocity transducer 55 and an associated electronic package 56, which operates a pneumatic actuator 57 to move damper vanes 58 for controlling the volume of outdoor air brought into the system. In this way, the volume of outdoor air introduced for ventilation is held at a virtually constant level, regardless of the cooling requirements, if any, placed on the system, despite changes occurring in the pressure within input plenum face and bypass damper 30 as the various damper sections 34, 36, 44, and 46 are opened and closed. The VAV unit 54 can also compensate for such effects as filter clogging and changes in atmospheric pressure. A fan (not shown) may also be placed in ventilation duct 14 to aid in maintaining a constant rate of airflow.

A method for obtaining the sequenced movement of vanes within damper sections as described above will now be described, with particular references being made to FIG. 2, which provides an elevational view of face and bypass dampers 30 and 32, together with the mechanisms 42 and 50 used for the movement of vanes within these dampers. While these mechanisms are shown as overlapping in this Figure, they are not connected mechanically; this overlap is simply due to the proximity of face and bypass dampers 30 and 32.

Figure 2:
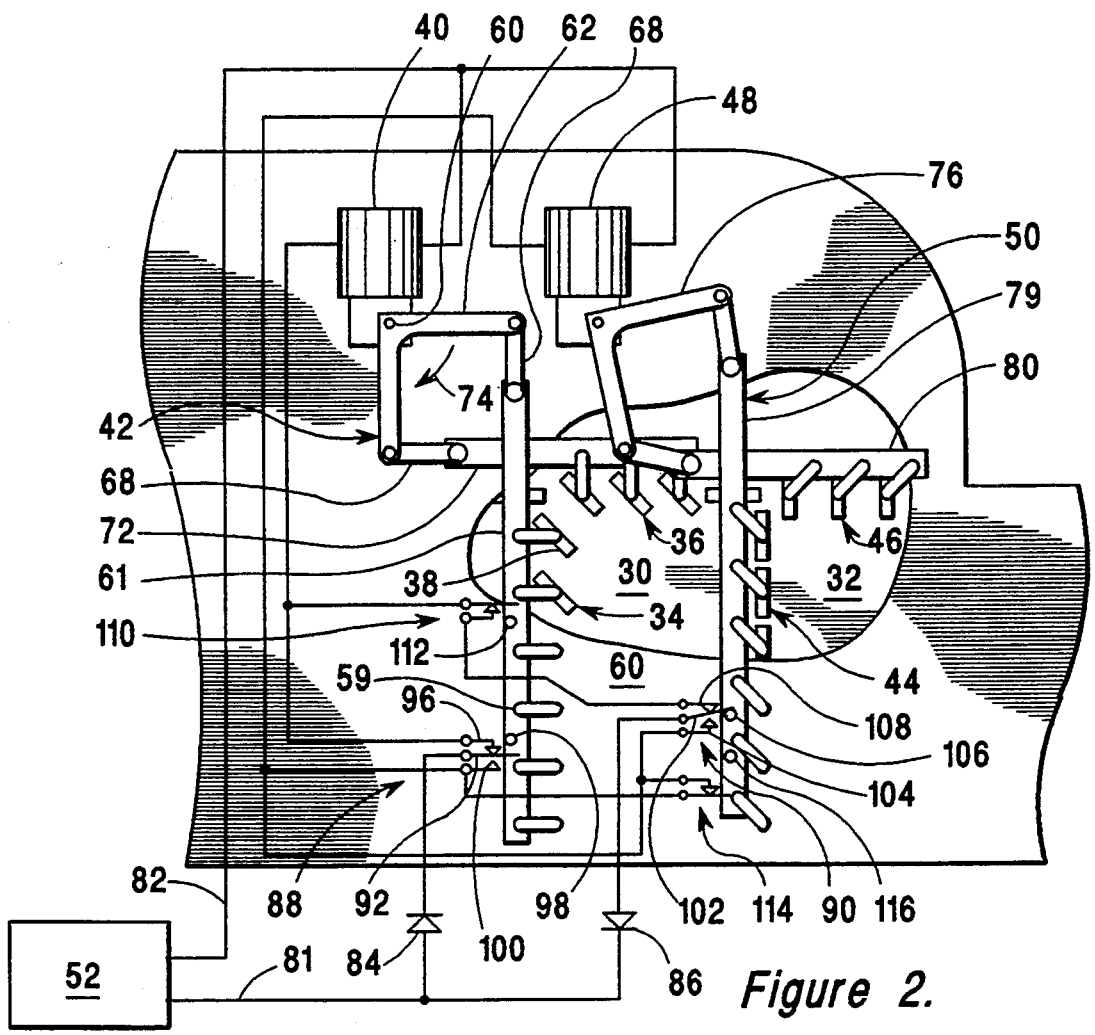
FIG. 2 is an elevational view of a mechanism used to operate damper units within the air conditioning system of FIG. 1.

As shown in FIG. 2, each vane 38 of face damper section 34 is mounted to pivot about a central axis defined by a rod 59 extending from each end of the vane through a pivot hole within an adjacent plate 60 forming a portion of the outer duct structure of the face and bypass dampers 30 and 32. On one side of these dampers, pivot rods 59 are extended and curved into a "U" shape to pivotally engage a drive link 61, by means of which the vanes 38 of damper section 34 are simultaneously opened and closed. Drive link 61 is moved by the rotation of crank 62, which is driven by means of a shaft 63 extending from a gearbox 64, which is in turn driven by attached outdoor air damper motor 40. A connecting link 68, pivotally mounted between drive link 61 and crank 62 allows the relative movement of drive link 61 in engagement with rods 59, and of crank 62 in engagement with pivotally driven shaft 63. Similarly, vanes 38 within bypass damper section 36 are opened and closed by the movement of drive link 70, which is similarly driven by crank 62 through a connecting link 68. As crank 62 is rotated in the direction of arrow 74, face damper section 34 is opened, while bypass damper section 36 is closed. As crank 62 is rotated opposite the direction of arrow 74, face damper section 34 is closed, while bypass damper section 36 is opened. FIG. 2 shows both face damper section 34 and bypass damper section 36 approximately half open.

In return duct face and bypass damper 32, face damper section 44 and bypass damper section 46 are opened and closed in a similar manner, as a crank 76 is pivotally driven by indoor air damper motor 48 to move drive links 79 and 80. FIG. 2 shows face damper section 44 fully closed, while bypass damper section 46 is fully open.

As previously described in reference to FIG. 1, controller 52 provides an output signal to open and close dampers face and bypass 30 and 32 in response to signals from thermostats 24 and 25 (both shown in FIG. 1). The damper motors 40 and 48 are permanent magnet types, operating according to the application of direct current within a suitable voltage range, and reversible by reversing the direction of current flow. To drive and control motors of this type, controller 52 provides direct current output at drive line 81. The polarity of this line 81 relative to a common line 82 is switched to reverse the direction in which a motor 40 or 48 is driven. Electrical connections are made so that, when current flows through outdoor air damper motor 40 in the direction permitted by diode 84, crank 62 is driven in the direction indicated by arrow 74, opening face damper section 34 as bypass damper section 36 is closed. When current flows through motor 40 in the direction permitted by diode 86, face damper section 34 is closed as bypass damper section 36 is opened. Similarly, when current flows through indoor air damper motor 48 in the direction permitted by diode 84, face damper section 44 is opened as bypass damper section 46 is closed; and, as current flows through motor 48 in the direction permitted by diode 86, face damper section 44 is closed as bypass damper section 46 is opened.

Limit switches 88 and 90 are used to provide the sequential operation of face and bypass dampers 30 and 32 in the general manner described above in reference to FIG. 1. The current flowing through diode 84 is provided as an input to transfer contact 92 of limit switch 88. When face damper section 34 of input plenum face and bypass damper 30 is closed or partially open, current to open face sections of the dampers flows through this transfer contact 92 and contact 96 to drive outdoor air damper motor 40 so that crank 62 is driven in the direction of arrow 72, further opening face damper section 38. When face damper section 38 is fury open, the engagement of transfer contact 92 with a pin 98 extending from drive link 61 causes the electrical contact between transfer contact 92 and contact 96 to be broken as electrical contact is established between transfer contact 92 and a contact 100, electrically connected to indoor air damper motor 48. Thus, while current no longer flows to open face section 34, a current path is established to open face section 44. Similarly, the current flowing through diode 86 is provided as an input to transfer contact 102 of limit switch 90. When face damper section 44 of return duct face and bypass damper 32 is fully or partially open, the current to close face sections of the dampers flows through transfer contact 102 and through a contact 104 to drive motor 48 so that face section 44 of face and bypass damper 32 is closed. When this face damper section 44 is fully closed, as it is shown in FIG. 2, a pin 106 extending from drive link 79 moves transfer contact 102 so that electrical contact with contact 104 is broken, while electrical contact with a contact 108, connected to outdoor air damper drive motor 40 is established. In this way, electrical current from controller 52 to close damper face sections is directed to close face section 34 of input plenum damper 30.

A limit switch 110 is included to interrupt the flow of current closing face damper section 34 of input plenum damper 30 when this damper section 34 is fully closed, as the contacts of this limit switch 110 are opened by a pin 112 extending from drive link 61. Similarly, a limit switch 114 is included to interrupt the flow of current to open face damper section 44 of indoor air damper 32 when this damper section 44 is fully opened, opening the contacts of this limit switch 114 by a pin 116 extending from drive link 79.

Limit switches 88 and 90 are preferably make-before-break types, in which, as the transfer contact is moved, a new electrical connection is made before the old electrical connection is broken. This feature assures that the drive links 61 and 79 do not stop in an intermediate position at which power is not transferred to either drive motor 40 or 48. While the use of limit switches in this way may result in the simultaneous operation of the motors for a short time as the transfer contacts are moved, such operation should pose no difficulties.

An alternative method for operating input plenum face and bypass damper 30 and return duct face and bypass damper 32 in the sequential mariner discussed generally with reference to FIG. 1 will now be discussed, with particular reference being made to FIGS. 3 and 4.

Figure 3:
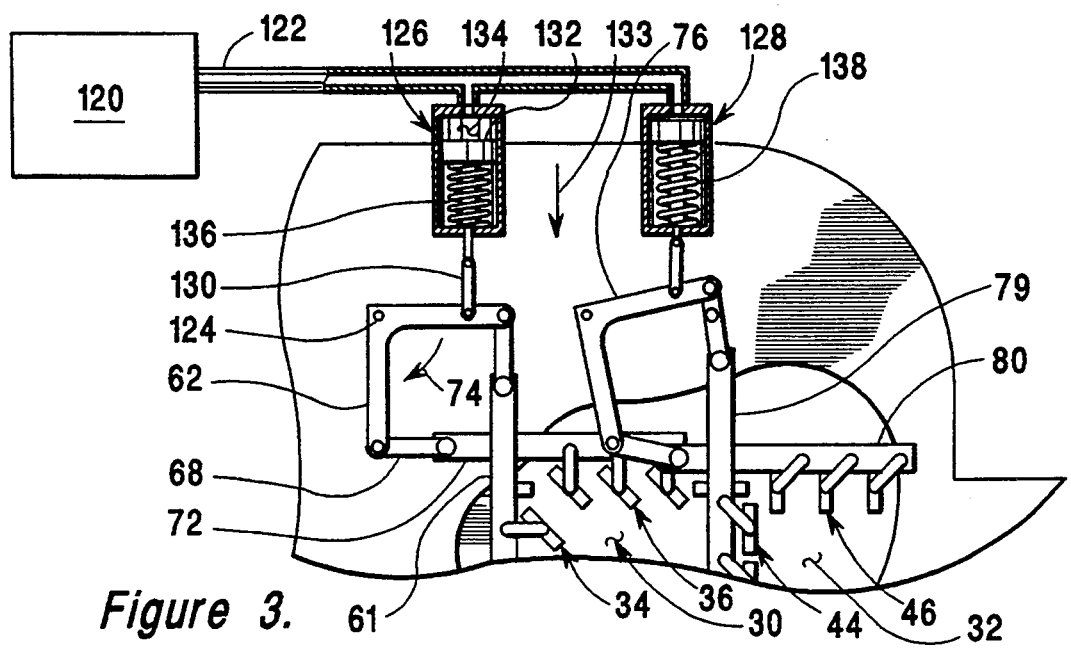
FIG. 3 is an elevational view of an alternative mechanism used to operate damper units within the air conditioning system of FIG. 1.
Figure 4:
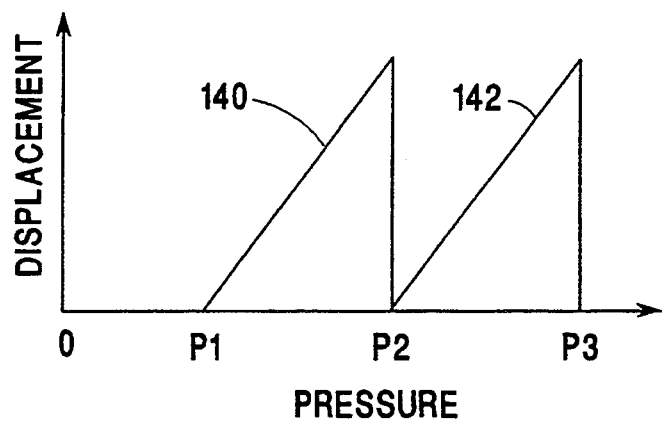
FIG. 4 is a graphical representation of the displacement produced by actuator units of FIG. 3 in response to variations in pneumatic pressure within a control line.

Referring first to FIG. 3, in the application of this alternative method, the control unit 52 (shown in FIG. 2), providing an electrical output as described above, is replaced with a control unit 120 providing a pneumatic output along a pneumatic control line 122. Operating in response to thermostats 24 and 25, control unit 120 produces a pressure in line 122 indicating the required rate of cooling. Within the operating capabilities of the air conditioning system, an increase in this pressure results in an increase in the rate of cooling, while a decrease in this pressure results in a decrease in the rate of cooling. When the pressure in line 122 is held constant, the rate of cooling is also held constant.

As described above in reference to FIG. 2, face damper section 34 and bypass damper section 36 of input plenum face and bypass damper 30 are opened and closed by means of drive links 61 and 72, respectively. Similarly, face damper section 44 and bypass damper section 46 of indoor face and bypass damper 32 are opened and closed by means of drive links 79 and 80, respectively. However, in the mechanism of FIG. 3, the cranks 62 and 76, imparting motion to these drive links by movement about pivots 124, are themselves moved by a pair of pneumatic actuators 126 and 128, respectively, through connecting links 130. Each actuator 126 or 128 includes a piston 132, which is driven in an actuation direction, indicated by arrow 133, by air pressure in a cylinder portion 134, acting against a force provided in a direction opposite to arrow 133 by a compression spring 136 or 138. The cylinder portion 134 of each actuator is connected to pneumatic control line 122.

While pneumatic pressure is exerted within each actuator 126 and 128, the characteristics of the springs 136 and 138 are chosen to provide for the sequential operation of the actuators. The properties of spring 138 are chosen so that it begins deflecting at the pressure required to fully deflect spring 136. These characteristics are graphically indicated in the force-deflection curves of FIG. 4. The air pressure output of controller 120 occurs within a range from 0 to P3. The motion output of actuator 126, which is arranged to operate input plenum face and bypass damper 30, is given by a first curve 140 in FIG. 4, while the motion output of actuator 128, which is arranged to operate return duct face and bypass damper 32 is given by second curve 142. Thus, as the pressure within pneumatic control line 122 is increased from a level zero, when a first pressure P1 is reached, actuator 126 begins to move, beginning the process of opening face section 34 of input plenum face and bypass damper 30. When a pressure P2 is reached, face section 34 is fully open, and the process of opening face section 44 of return duct face and bypass damper 32 is begun. When pressure P3 is reached, face section 44 is fully open. As each face section is opened, the corresponding bypass section is closed by the mechanism described above. This process is reversed as the pressure in pneumatic control line 122 is decreased.

While the preceding discussion covers the use of different springs 136 and 138 in pneumatic actuators which are otherwise similar, alternately, similar springs can be used, as the sequence of operation of the actuators is controlled with a larger-diameter outdoor air damper actuator 126 and a smaller-diameter indoor air damper actuator 128. The larger diameter generates more force to be applied to the spring 136 in the actuator 126, so that movement within it is generated at lower control line pressures, opening face section 34 of outdoor air damper 30 while face section 44 of indoor air damper 32 is held shut.

While the above discussion generally applies to the operation of the mechanism shown in FIG. 3, it is understood that a somewhat idealized situation is described. Mechanical friction within the system can be expected to contribute a hysteresis effect, displacing the curves produced with return motions from those produced as the pressure is increased. In fact, it is not necessary to configure or adjust the springs 136 and 138 so that the motion of actuator 128 begins exactly when the motion of actuator 126 is completed. A relatively small overlap in these motions, i.e. a small amount of simultaneous motion of the actuators, is expected to have no significant effect on the operation of the air conditioning system. Even if the variations of spring properties drive the system in the other direction, so that there is a relatively small range of pressure within control line 122 for which changes in the actuator output do not occur, the air conditioning system can be expected to operate satisfactorily, since the operation of the controller 120 in response to thermostats will eventually increase or decrease the control line pressure to a point at which actuator motion begins.

A method for chilling the water circulating through pipes 20 and heat exchanger 18 will now be discussed in reference to FIG. 5, which is an elevational view of a refrigeration system having an evaporator 143 through which water from pipes 20 is circulated by means of a pump 144. Heat is removed from the water in pipes 20 by a refrigeration process involving the evaporation of a refrigerant, such as one of the halogenated hydrocarbons sold by the DuPont Corporation under the trademark "Freon," forced through an expansion nozzle 145. Evaporator 143 includes separate paths for water and refrigerant, while acting as a heat exchanger, allowing the transfer of heat between the water and refrigerant. The refrigerant is circulated in a closed system 146 by the pumping action of a compressor 147. After the compression process, heat is removed from the refrigerant in a condenser 148, which may by cooled by outdoor air driven by a fan 149. Alternately, a water cooling process (not shown) may be used to cool refrigerant in the condenser.

This refrigeration system is preferably operated to maintain chilled water at a nearly constant temperature of about 45 degrees F. Thus, a process controller 150 operates in response to an output signal from a thermostat 151, controlling the operation of compressor 147 to maintain the desired temperature. Similar results may be obtained by alternately measuring and controlling the temperature or pressure of the refrigerant circulating through evaporator 143. This control may consist, for example, of turning the compressor 147 off and on as required to maintain the temperature, or of varying the rotational speed of compressor 147 for this purpose.

Figure 5:
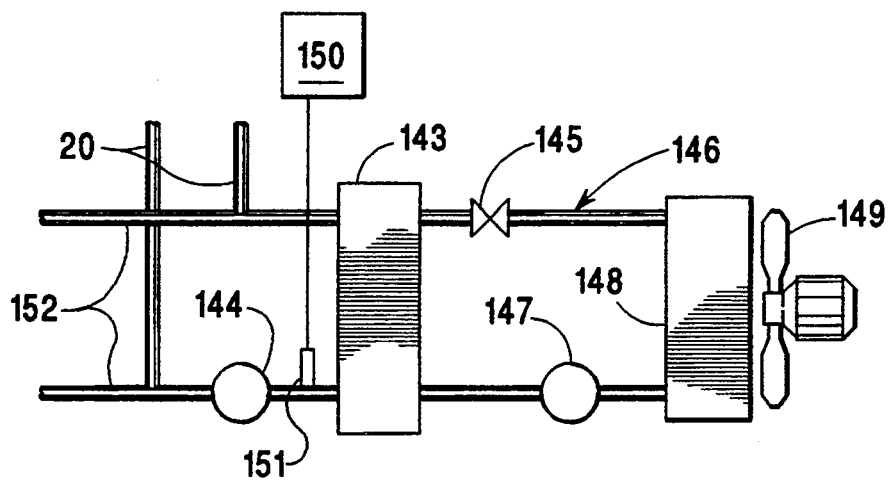
FIG. 5 is an elevational view of a refrigerant system used to provide chilled water for the air conditioning system of FIG. 1.

The refrigeration system of FIG. 5 may be used to provide chilled water for a number of air conditioning systems of the types shown in FIG. 1. Thus, additional chilled water pipes 152 may be directed to other air conditioning systems.

An air conditioning system configured according to an alternative embodiment of the present invention will now be discussed, with particular reference being made to FIGS. 6 and 7. In these Figures, various items similar in configuration and function to items previously discussed are indicated by like reference numerals.

Figure 6:
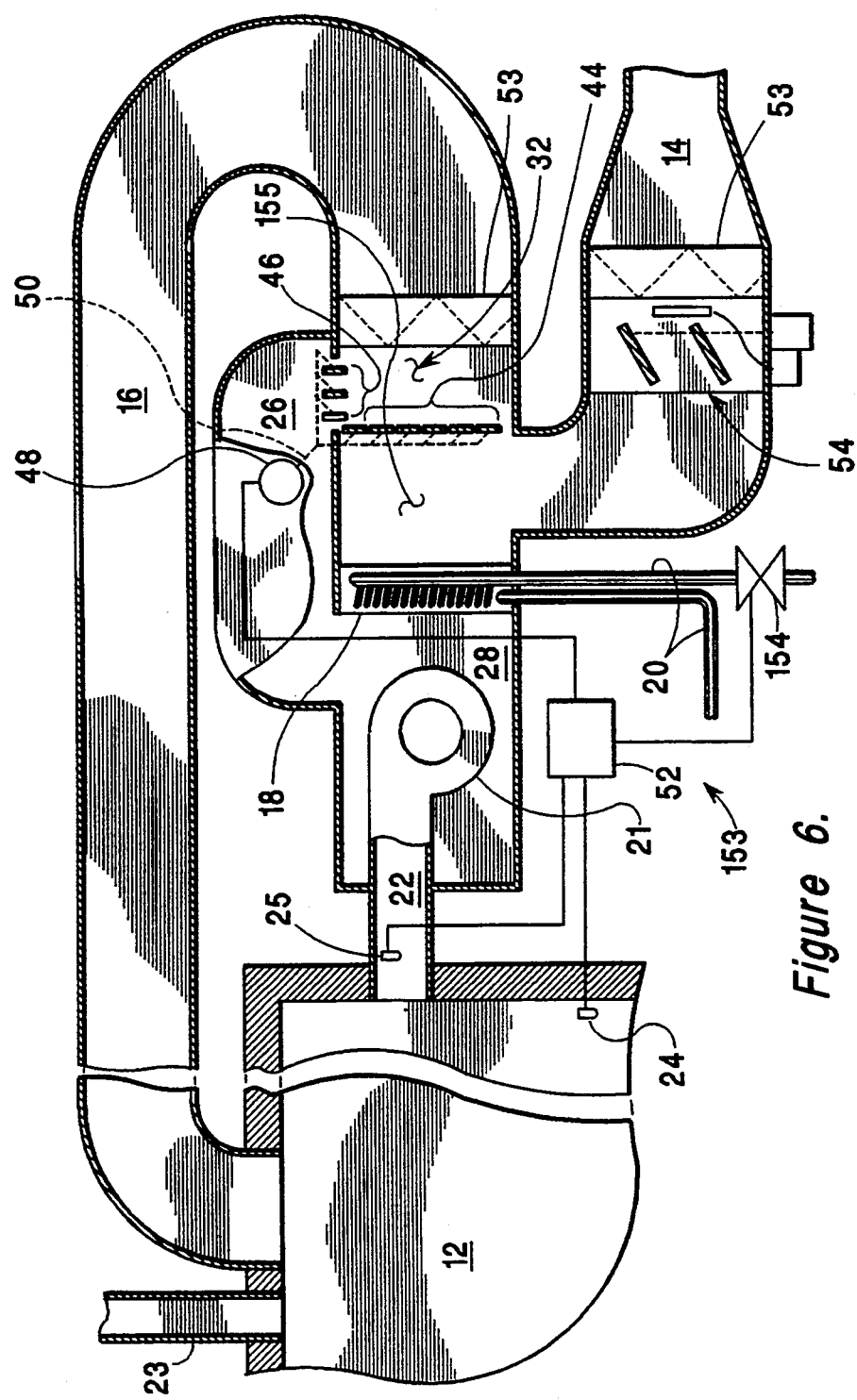
FIG. 6 is a sectional elevational view of an air conditioning system built in accordance with a second embodiment of the present invention.

FIG. 6 is an elevational view of this alternative air conditioning system 153, in which the rate at which cooling occurs within the system is controlled by a single face and bypass damper 32, together with a valve 154 regulating the flow of a coolant through heat exchanger 18. Various items similar in configuration and function to items previously discussed are afforded like reference numerals. Thus, in air conditioning system 153, input plenum face and bypass damper 30 (shown in FIG. 1) is eliminated, so that the entire volume of outdoor air moving through the system is moved through heat exchanger 18, regardless of the cooling needs, if any, being placed on the system.

Other elements in alternative system 153 are similar of identical to corresponding elements discussed in reference to FIG. 1. Outdoor air for ventilation enters the system through ventilation shaft 14, while recirculating indoor air is drawn through return duct 16. Air is moved, by means of fan 21, through a supply duct 22 into generally enclosed space 12. Fan 21 draws air from a plenum 28, in which air flowing through heat exchanger 18 is typically mixed with air flowing through bypass duct 26. An exhaust duct 23 may be provided for removing air from generally enclosed space 12. Filters 53 are provided to facilitate the removal of particles from both recirculating indoor air and from outdoor air as it is moved into the system. A VAV unit 54 is used to ensure that outdoor air will be introduced at a constant volummetric rate, without regard for air cooling requirements.

For example, when there is no need for cooling, the flow of the coolant, such as chilled water, through pipes 20 into heat exchanger 20, is shut off with valve 154, and the flow of indoor recirculating air from duct 16 is entirely directed through bypass duct 26 by closing face damper section 44 while bypass damper section 46 is fully opened, as shown in FIG. 6. In this example, as an increasing need for cooling is established, valve 154 is opened to begin and increase the flow of coolant through heat exchanger 18. This process continues until maximum cooling using only outdoor air is established, with valve 154 fully open to provide a full flow of coolant through heat exchanger 18. Beyond this point, additional cooling is provided through the cooling of indoor air, as face damper section 34 is opened. Motor 48 opens face damper section 34 while simultaneously closing bypass damper section 46, by means of mechanism 50. A mixing region 155 between face and bypass damper 32 and heat exchanger 18 serves as a plenum chamber where outdoor air is mixed with recirculating indoor air before the resulting mixture is drawn through heat exchanger 18. When face damper section 46 is fully opened, the maximum rate of cooling compatible with the ventilation requirements placed on the system is reached.

The example described above, in which the cooling requirements placed on a system are increased from a level not requiring cooling to the maximum level which the system can handle while meeting ventilation requirements, is included to illustrate the various operational states of the air conditioning system 153. In reality, the system may be turned on to operate at any point in this range of cooling requirements. When cooling requirements are reduced, changes in processes occur in a sequence opposite to that described above.

Figure 7:
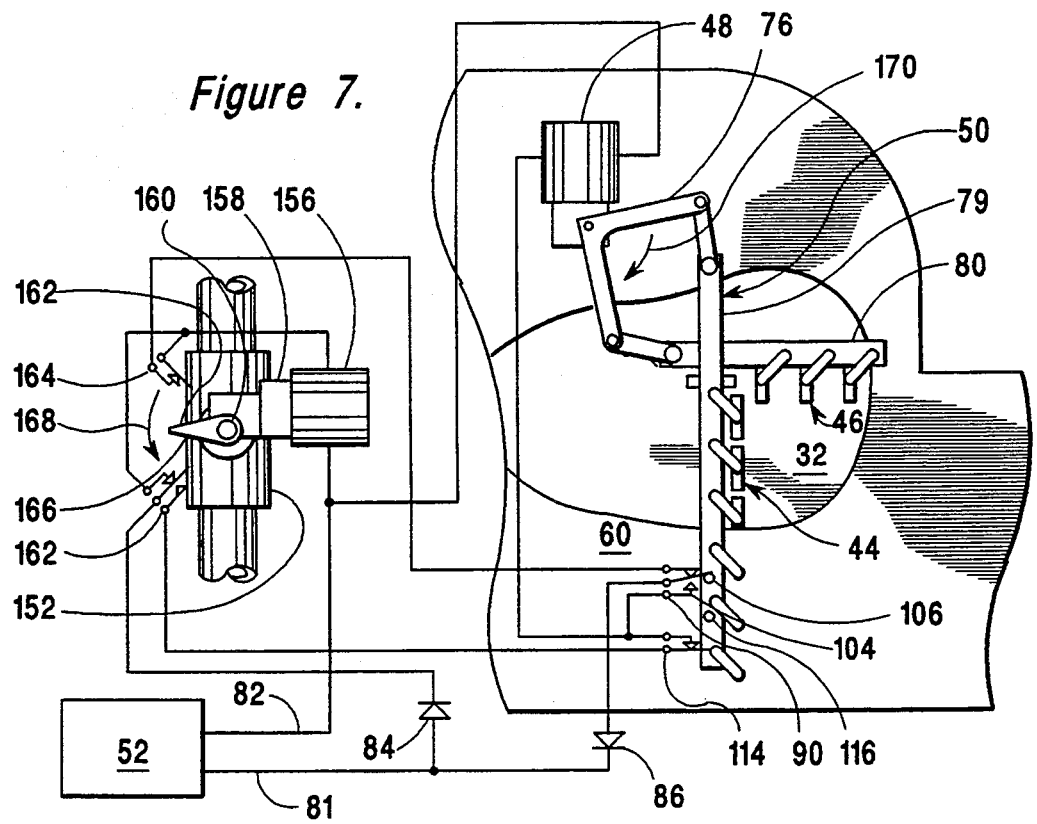
FIG. 7 is an elevational view of a mechanism used to operate a damper unit and a coolant valve within the air conditioning system of FIG. 6.

FIG. 7 is a schematic elevational view of a mechanism used to operate coolant control valve in accordance with the present invention. As previously described in reference to FIG. 2, face damper section 44 and bypass damper section 46 of face and bypass damper 32 are moved by a permanent-magnet type motor 48 through a mechanism 50. Another permanent magnet type motor 156 is provided to open and close coolant valve 154 by driving a gearbox 158. Valve 154 may be, for example a plug valve with an internal rotatable plug (not shown) turning through a right angle between a fully closed and a fully open position. A pivot shaft 160, extending outward from the plug and driven by motor 156, is attached to a switch actuator arm, is attached to a switch actuating arm 162 to open the contacts of a limit switch 64 as valve 154 is driven into a fully closed position, and to operate the transfer contact of another limit switch 166 as valve 154 is driven into a fully open position.

Also as previously described in reference to FIG. 2, controller 52 provides a direct current drive signal on line 81 when it is necessary to increase or decrease the rate of cooling provided by the air conditioning unit 153, preferably in response to signals from thermostats 24 and 25 (shown in FIG. 6). The direction of current flowing on line 81 determines whether the rate of cooling will be increased or decreased, with current flowing in the direction permitted by diode 84 increasing the rate of cooling, opening valve 154 by turning pivot shaft 160 in the direction of arrow 168 and opening face damper unit 44 by turning crank 76 in the direction of arrow 170. When current is provided through diode 84 to increase the rate of cooling, limit switch 166 directs this current to drive motor 156 if valve 154 is not fully open, or to drive motor 48 if valve 154 is fully open. Contact between a pin 106 on drive link 79 of mechanism 50 stops this flow of current when face damper section 44 is fully opened by motor 48. When current is provided through diode 86 to decrease the rate of cooling, limit switch 90 directs this current to drive motor 48 if face damper section 44 is not fully closed, or to motor 156 if face damper section 44 is fully closed, as shown in FIG. 7.

The preceding discussion has assumed that a source of a coolant, such as chilled water is available for use in heat exchanger 18. In commercial applications, chilled water at about 45 degrees F. is commonly available for use in air conditioning systems. The source of chilled water may be, for example, a system using a refrigerant circulating through one or more compressors, a condenser, an expansion valve, and an evaporator operating as a heat exchanger in the water cooling process.

Figure 8:
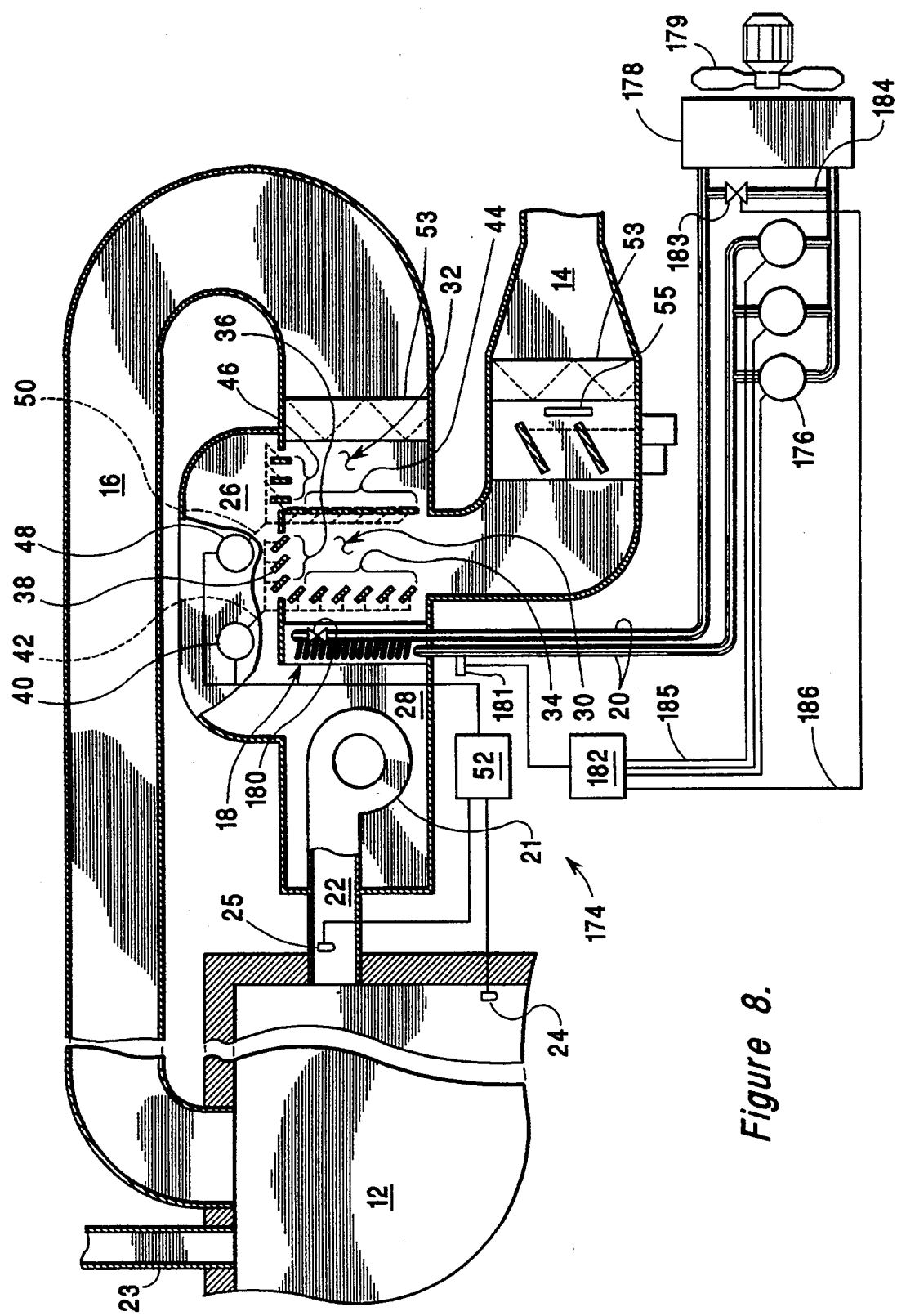
FIG. 8 is a sectional elevational view of an air conditioning system built in accordance with a third embodiment of the present invention.

As shown in FIG. 8, a circulating refrigerant is alternately applied directly within heat exchanger 18, which becomes the evaporator, or direct expansion unit, in an air conditioning system 174 otherwise generally constructed as described above in reference to FIG. 1. A refrigerant in such a process is typically a compound existing in a liquid state in one part of the process and in a vapor state in another part of the process. A number of halogenated hydrocarbons, sold by the DuPont corporation under the trademark "Freon," may be used as refrigerants for this purpose. In the operation of a closed system of this kind, the refrigerant, flowing through lines 20, is compressed as it is moved, from the evaporator (heat exchanger 18) through one or more compressors 176 into a condenser 178, where heat is taken from the refrigerant to be exhausted into a stream of air moved by a fan 179. The circulating movement of refrigerant causes the flow of liquid refrigerant through an expansion valve 180 into heat exchanger 18, where evaporation of the refrigerant removes heat from air flowing this heat exchanger.

As previously described in reference to FIG. 1, a room temperature thermostat 24 is provided in the generally enclosed space 12 cooled by the air conditioning system, and a supply air thermostat 25 is placed in supply duct 12 provide indications of the effectiveness of the cooling process and of changes in the air conditioning load being placed on the system. Also as previously described, the signals provided by these thermostats are used by controller 52 to increase or decrease the rate of cooling by increasing or decreasing the flow of air through the heat exchanger 18 through the use of face and bypass dampers 30 and 32.

In accordance with a preferred version of the embodiment of the present invention represented by FIG. 8, the various elements of the system are operated in such a way that dehumidification is optimized by favoring the cooling of outdoor air before indoor air is moved through heat exchanger 18.

The circulation of refrigerant within pipes 20 is preferably controlled to maintain a nearly constant temperature of about 40 degrees F. at heat exchanger 18. This type of operation is particularly desirable because heat exchanger 18 is maintained at a temperature low enough for the effective cooling of air without being brought to a temperature low enough to permit the formation of ice within the air path through heat exchanger 18. The formation of ice is desirably avoided to prevent blocking the air path through the heat exchanger. The temperature of the refrigerant is thus preferably maintained at a nearly constant level, as indicated by measuring the physical state of the refrigerant at the evaporator, using a transducer 181, with controlling logic being provided by refrigeration process controller 182. This transducer 181 may, for example, measure the temperature of the refrigerant entering, within, or leaving the heat exchanger 18. On the other hand, since the physical characteristics of the refrigerant are known, the temperature of the refrigerant can be effectively controlled using measurements of its pressure. As these the cooling requirements placed on the refrigeration system are varied, changes in the physical state (temperature or pressure) measured by transducer 181 cause controller 52 to vary the operation of the means used to compress the refrigerant.

A number of methods may be used to vary the means of compression. For example, as shown in FIG. 8, when several individual compressors 176, are provided to operate in a parallel relationship between the outlet of heat exchanger 18 and the inlet of condenser 178 the flow of refrigerant through pipes 20 may be varied by varying the number of operating compressors. Thus, as the cooling requirement placed on the air conditioning system 174 is reduced, one of the compressors 176 is disabled. A compressor may be disabled, for example, by operating a valve so that refrigerant is not pumped through the compressor, or by disengaging a clutch or turning off a motor to terminate the rotational drive of the compressor. One problem associated with the switching of individual compressors 176 in this way arises from the fact that a stepwise, rather than continuous variation in the flow rate of refrigerant is obtained. Thus, if three compressors 176 are provided, as shown in the example of FIG. 8, three levels of refrigerant flow are produced. This type of control may not be adequate to maintain the refrigerant temperature as closely as desired, requiring the use of another means to vary operation of the process. For example, a bypass pipe 183 with a valve 184 may be provided for allowing hot refrigerant to bypass condenser 178, thus raising the temperature of the refrigerant circulating through pipes 20. In this example, the individual compressors 176 and bypass valve 184 are controlled by refrigeration process controller 182, using electrical or pneumatic control lines 185 and 186, respectively.

Other methods for controlling the refrigeration process may alternatively be used. For example, the flow of refrigerant may be varied in a continuous fashion by varying the rotational speed at which one or more compressors 176 is driven. With continuous control of this type, bypass pipe 183 is not required.

Thus the air conditioning system of FIG. 1, using the refrigeration process discussed in reference to FIG. 5, and the air conditioning system of FIG. 8 are similar in that a control system is used to control the temperature of the cooling medium (chilled water or refrigerant) circulated through heat exchanger 18. The temperature of the cooling medium in both systems is preferably held at a constant temperature of about 40 to 45 degrees F. The other elements of the two systems, such as the control of face and bypass dampers 30 and 32 are accomplished in the same fashion.

Thus, in each of the embodiments of the present invention, control of an overall cooling rate provided by the air conditioning system is achieved using two methods of regulation. The first of these methods controls the rate at which heat is removed from air flowing through an input plenum area, which is formed within the input plenum face and bypass damper 30 of the embodiments shown in FIGS. 1 and 8, and in the mixing region 155 of the embodiment shown in FIG. 6. The operation of the return duct face and bypass damper 32 is controlled so that indoor air from return duct 16 is admitted to the input plenum area only in quantities required to provide sufficient airflow through heat exchanger 18 to achieve the overall cooling rate required. Since all of the outdoor air flows through the input plenum area, and since no more indoor air than necessary flows through this area, maximizing the cooling of air flowing through the input plenum maximizes the cooling of outdoor air, thus enhancing the dehumidification process.

In the embodiments of FIGS. 1 and 8, control of the rate at which heat is removed in air flowing through the mixing plenum is achieved by controlling the rate at which air flows through heat exchanger 18. Air flowing through bypass duct 26 is not cooled by heat exchanger 18. Therefore as face damper 34 is opened while bypass damper 36 is closed, a resulting increase in the flow of air through heat exchange 18 causes this rate of cooling to be increased.

In the embodiment of FIG. 6, control of the rate at which heat is removed in air flowing through the mixing plenum is achieved by controlling a rate at which the cooling medium flows through heat exchanger 18. All of the air flowing through ventilation duct 14 flows through heat exchanger 18.

With both of these methods, a limit is reached at which the maximum cooling of outdoor air is achieved. To achieve greater cooling rates, the second of method of regulation is employed, as indoor air is introduced into the input plenum region by opening return duct face damper 44 while closing return duct bypass damper 46.

The advantages of the present invention, together with the relative merits of different versions thereof, can further be understood with reference to the graphical representations of FIGS. 9 through 12. Each of these Figures shows the indoor air humidity obtained through the use of a conventional air conditioning system, and through the use of the embodiments of the present invention discussed above in reference to FIGS. 1, 6, and 8. Each FIG. 9 through 12 shows the results of calculations based on cooling an indoor space to 75 degrees F. using a mixture of recirculating indoor air and outdoor air at 91 degrees F. with a relative humidity of 60 percent. The ratio of outdoor air to indoor air is held constant in each Figure, being varied from one Figure to another. In each Figure, variations in the air conditioning load are shown along the horizontal axis, being expressed as a supply air temperature differential in degrees F. In other words, as the air conditioning load is increased; i.e. if the heating occurring within the indoor space is increased, the difference between the temperature at room air thermostat 24 and at supply air thermostat 25, called the supply air temperature differential, is increased.

Each FIG. 9 through 12 includes three curves. One curve is based on the operation of a conventional system, in which the required proportion of outdoor air is mixed with recirculating indoor air before cooling occurs. The other two curves are based on the operation of the present invention, as described in reference to FIGS. 1 or 8, and in reference to FIG. 6, respectively. In regard to the reduction in humidity, the systems described in reference to FIGS. 1 and 8 perform similarly. In each FIG. 9 through 12, the curves for the three systems meet at a point 190, with a supply air temperature differential of 21 degrees F., where maximum cooling is provided. At this point, the three systems operate the same way, with a maximum cooling rate applied within the heat exchanger and with a maximum flow of both outdoor and indoor air through the heat exchanger.

Figure 9:
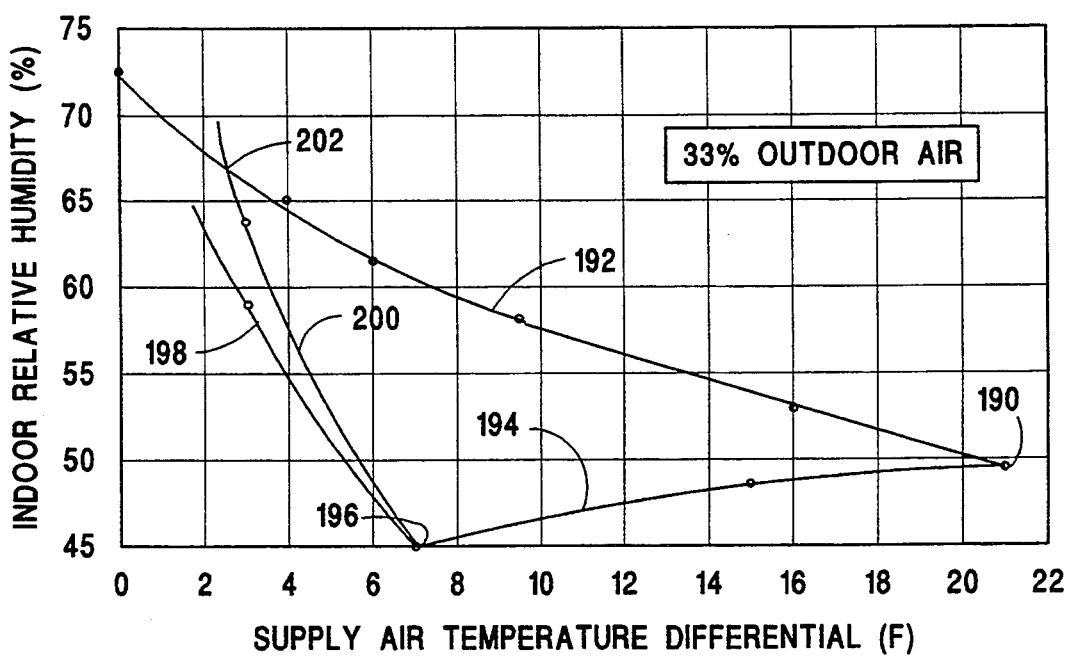
FIG. 9 is a graphical representation of the indoor humidity conditions obtained using a conventional air conditioning system, and the various embodiments of the present invention, as 33 percent of the air moved through the system is outdoor air provided for ventilation.

FIG. 9 shows the operation of the three air conditioning systems under the condition of a required usage of 33 percent outdoor air. The operation of the conventional system is represented by curve 192. For conditions of a medium to high air conditioning load, requiring a supply air temperature differential above about seven degrees F, the various embodiments of the present invention operate in the same way, as indicated by a common curve 194 between point 190 and a point 196. This curve 194 represents a range through which the rate of cooling provided by the system is varied by changing the flow of indoor air through the heat exchanger within each of the embodiments of the present invention. At point 196, the flow of indoor air through the heat exchanger has been shut off, but there is a full flow of outdoor air through the heat exchanger. For supply air temperature differential values below point 196, variations in the cooling rate of the system are achieved by reducing the flow of outdoor air through the heat exchanger in the embodiments of FIGS. 1 and 8, or by reducing the flow of coolant through the heat exchanger in the embodiment of FIG. 6. A problem associated with reducing the flow of coolant through the heat exchanger is that the subsequent increase in the temperature of the heat exchanger reduces the dehumidification produced by the system. This effect reduces the dehumidification occurring within the embodiment of FIG. 6 to an extent greater than the corresponding reduction in dehumidification caused by the reduction of airflow used decrease the rate of cooling in the embodiment of FIG. 1. Thus, at supply air temperature differential values below point 196, curve 198 reflects the performance of the embodiment of FIG. 1, while curve 200 reflects the performance of the embodiment of FIG. 6, indicating that, the embodiment of FIG. 1 has better performance than the embodiment of FIG. 6 under low load conditions.

Consideration of the conditions chosen for the development of the data shown in FIG. 9 leads to the conclusion that, even under the conditions of no air conditioning load in the interior space to which the output of the air conditioning system is applied, cooling must be accomplished because a significant percentage of the air being drawn through the system is outdoor air at the much higher temperature of 91 degrees F. Thus, under low load conditions, or even under no load conditions, the three types of systems operate differently, with the embodiment of FIG. 1 continuing to have the advantage of applying cooling only to outdoor air, while the system of FIG. 6 has the disadvantage of operating the heat exchanger at temperatures which are much less effective in producing dehumidification. For this reason, the system FIG. 6 exhibits a crossover condition at point 202. With an air conditioning load causing a supply air temperature differential below this point, the embodiment of FIG. 6 does not dehumidify as well as a conventional system. On the other hand, FIG. 9 indicates that, for a wide range of useful operating conditions, the embodiment of the present invention provide substantial improvements over the standard system. This improvement results from the fact that the present invention cools the outdoor air used for ventilation, which is the most important source of moisture in the air conditioned space, to the greatest extent consistent with cooling needs.

Figure 10:
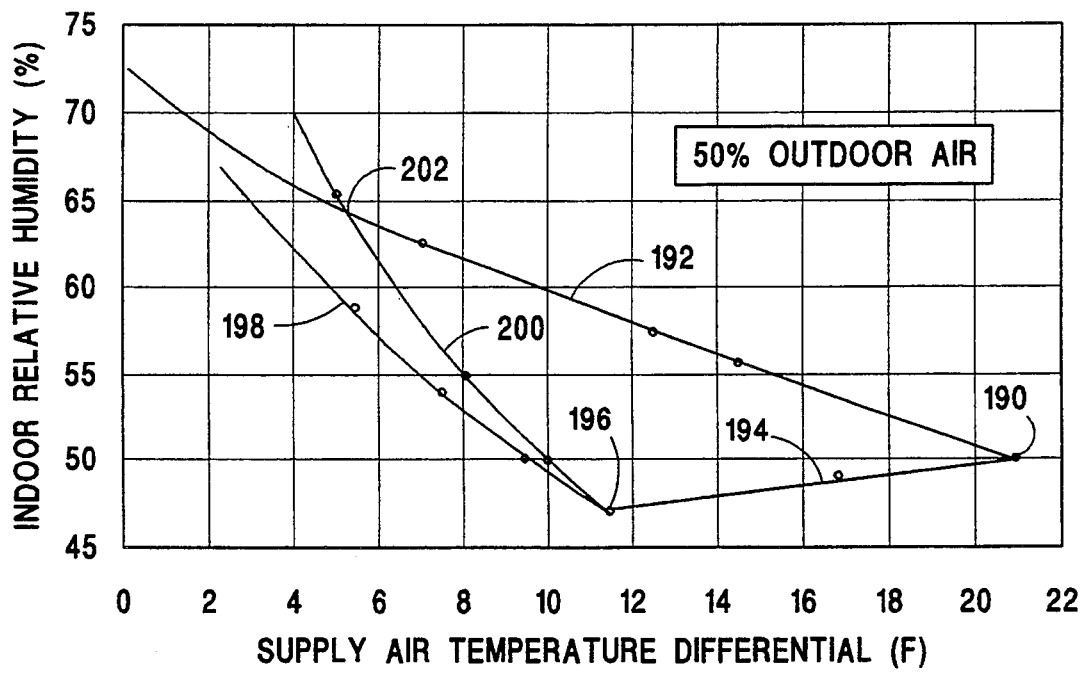
FIG. 10 is a graphical representation similar to FIG. 9, except that 50 percent outdoor air is provided.
Figure 11:
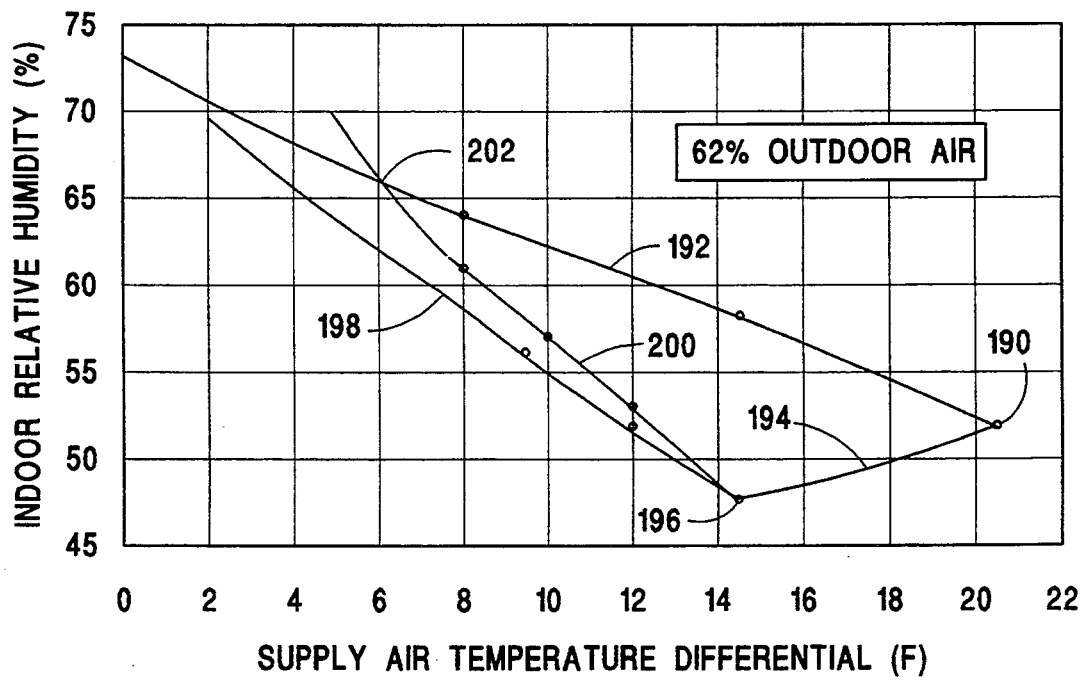
FIG. 11 is a graphical representation similar to FIG. 9, except that 62 percent outdoor air is provided.
Figure 12:
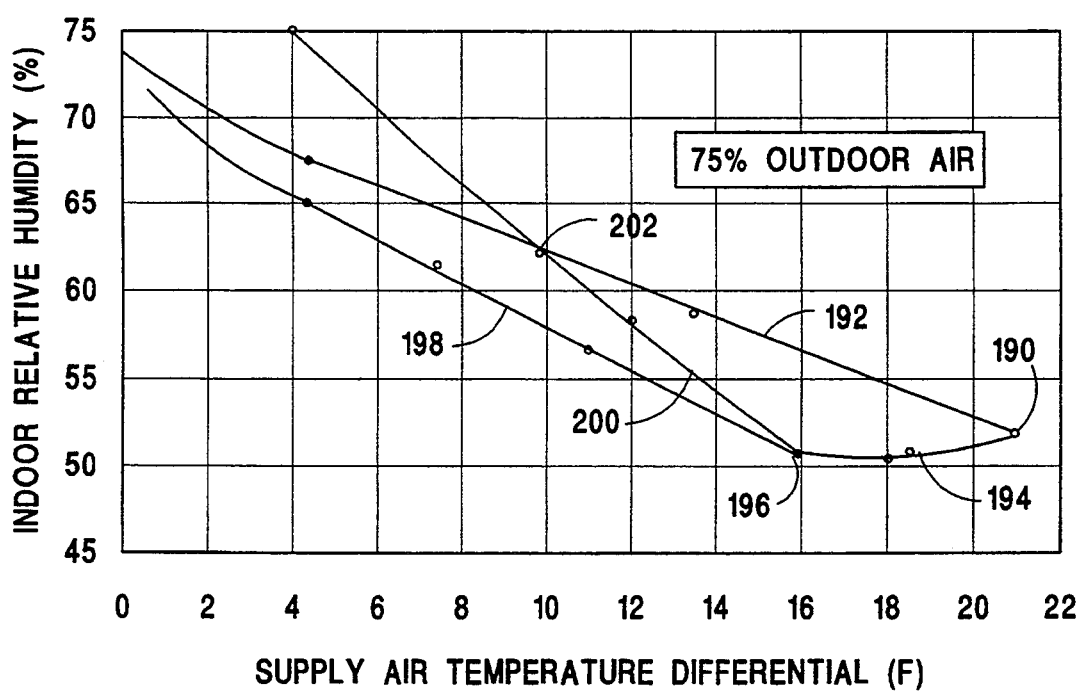
FIG. 12 is a graphical representation similar to FIG. 9, except that 75 percent outdoor air is provided.

FIGS. 10 through 12 show similar comparisons among the operation of the conventional air conditioning system and the various embodiments of the present invention. The various curves and points of FIGS. 10 through 12 are described by the same reference numerals as the corresponding points and curves of FIG. 9. FIG. 10 shows the operation of the systems with a requirement that 50 percent of the air moving through the air conditioning system must be outdoor air, while FIG. 11 shows operation with this requirement being for 62 percent outdoor air, and while FIG. 12 shows operation with this requirement being for 75 percent outdoor air.

While the invention has been described in its preferred form or embodiment with some degree of particularity, it is understood that this description has been given only by way of example and that numerous changes in the details of construction, fabrication and use, including the combination and arrangement of parts, may be made without departing from the spirit and scope of the invention.

What is claimed is:

1. An air conditioning system comprising:
   a return duct extending to a source of indoor air;
   a ventilation duct extending to a source of outdoor air;
   a input mixing plenum for mixing air from said return duct with air from said ventilation duct;
   cooling means for cooling air provided thereto from said input mixing plenum;
   a bypass duct extending around said cooling means from said indoor air supply duct;
   first airflow regulation means to control the flow of air from said return duct into said input mixing plenum and into said bypass duct;
   an output mixing plenum for mixing air flowing from said cooling means with air flowing from said bypass duct;
   a supply duct through which air from said output mixing plenum is discharged;
   a fan for moving air from said return duct and from said ventilation duct, through said cooling means and through said bypass duct, to said supply duct;
   cooling regulation means controlling a rate at which heat is removed from air flowing through said input mixing plenum; and
   system control means for providing a variable overall rate of air cooling, wherein, to provide relatively low levels of said overall rate of air cooling, said system control means varies operation of said cooling regulation means, while holding said first airflow regulation means in a state providing a minimum level of airflow from said return duct into said input mixing plenum, and wherein, to provide relatively high levels of said overall rate of air cooling, said system control means varies operation of said first airflow regulation means, while holding said cooling regulation means at a level providing maximum cooling of air flowing through said input mixing plenum.

2. The air conditioning system of claim 1, wherein said cooling means includes a first heat exchanger, having a heat exchanger coolant path through which a chilled coolant is pumped and having an airflow path through which air moves from said input mixing plenum to said output mixing plenum.

3. The air conditioning system of claim 2, wherein said cooling regulation means includes means for regulating the rate at which said coolant flows through said coolant path.

4. The air conditioning system of claim 2, wherein said cooling means includes in addition:
   a refrigerant circulation path through which a refrigerant is circulated;

an evaporator having an evaporator coolant path through which said coolant is circulated and an evaporator refrigerant path forming a part of said refrigerant circulation path;

compressor means for compressing said refrigerant from said evaporator refrigerant path;

a condenser for cooling said refrigerant compressed by said compressor means;

an expansion nozzle through which said refrigerant is forced into said evaporator; and refrigeration control means for varying said compressor means to control a temperature of said evaporator.

5. The air conditioning system of claim 1, wherein said cooling means includes a closed path through which a refrigerant is circulated, said closed path including:

an evaporator having an airflow path through which air moves from said input mixing plenum to said output mixing plenum;

compressor means for compressing said refrigerant from said evaporator, the operation of said compressor means being varied to control a rate at which said refrigerant flows through said evaporator;

a condenser for cooling said refrigerant compressed by said compressor means; and an expansion nozzle through which said refrigerant is forced into said evaporator.

6. The air conditioning system of claim 5, wherein said cooling regulation means includes refrigerant state measuring means for measuring a physical state of said refrigerant entering said evaporator, and means for regulating said compressor means in response to said refrigerant state measuring means to maintain a constant temperature within said evaporator.

7. The air conditioning system of claim 1, wherein said first airflow regulation means includes:

a return duct face damper extending between said return duct and said input mixing plenum;

a return duct bypass damper extending between said return duct and said bypass duct.

return duct damper drive means for opening and closing said return duct face damper and said return duct bypass damper.

8. The air conditioning system of claim 1, wherein said cooling regulation means includes:

means for directing airflow from said input mixing plenum into said bypass duct; and second airflow regulation means to control the flow of air from said input mixing plenum into said cooling means and into said bypass duct.

9. The air conditioning system of claim 1:

wherein said system control means provides a signal of a first type for increasing said rate of air cooling and a signal of a second type for decreasing said rate of air cooling;

wherein said first airflow regulation means includes a first airflow regulation drive moving in a first direction when said signal of a first type is applied thereto, and opposite said first direction when said signal of a second type is applied thereto, with movement of said first airflow regulation drive in said first direction increasing airflow from said return duct to said input mixing plenum and decreasing airflow from said return duct to said bypass duct, and with movement of said first airflow regulation drive opposite said first direction decreasing airflow from said return duct to said input mixing plenum and increasing airflow from said return duct to said bypass duct;

wherein said cooling regulation means includes a cooling regulation drive moving in a second direction when said signal of a first type is applied thereto, and opposite said second direction when said signal of a second type is applied thereto, with movement of said cooling regulation drive in said second direction increasing said rate at which heat is removed within said cooling means, and with movement of said cooling regulation drive opposite said second direction reducing said rate at which heat is removed within said cooling means; and wherein said system control means includes first switching means applying said signal of a first type to said first airflow regulation drive when said cooling regulation drive is in a position maximizing said rate at which heat is removed within said cooling means, and applying said signal of a first type to said cooling regulation drive when said cooling regulation drive is not in said position maximizing said rate at which heat is removed within said cooling means, said system control means additionally including second switching means applying said signal of a second type to said cooling regulation drive when said first airflow regulation drive is in a position minimizing said flow of air from said return duct into said mixing plenum, and applying said signal of a second type to said cooling regulation drive when said first airflow regulation drive is not in said position minimizing said flow of air from said return duct into said mixing plenum.

10. The air conditioning system of claim 9:

wherein said first airflow regulation means includes a first return duct face damper extending between said return duct and said input mixing plenum, said first airflow regulation means additionally including a first return duct bypass damper extending between said return duct and said bypass duct;

wherein said first airflow regulation drive includes airflow linkage means closing said return duct bypass damper as said return duct face damper is opened, and a first airflow regulation motor driving said airflow linkage means to open said return duct face damper as a current is applied thereto in a first current direction and to close said return duct face damper as a current is applied thereto opposite said first current direction;

wherein said cooling regulation means includes an input plenum face damper extending between said input mixing plenum and said cooling means, said cooling regulation means additionally including an input plenum bypass damper extending between said input mixing plenum and said cooling means;

wherein said cooling regulation drive includes cooling linkage means closing said input plenum bypass damper as said input plenum face damper is opened, and a cooling regulation motor driving said cooling linkage means to open said input plenum face damper as a current is applied thereto in a second current direction and to close said input plenum face damper as a current is applied thereto opposite said second current direction.

wherein said signal of a second type comprises an electrical current flowing in a direction opposite the current flow of said signal of a first type;

wherein said first switching means applies said signal of a first type to said first airflow regulation motor in said first current direction and to said cooling regulation motor in said second current direction; and wherein said second switching means applies said signal of a second type to said first airflow regulation motor opposite said first current direction and to said cooling regulation motor opposite said second current direction.

11. The air conditioning system of claim 9:

wherein said first airflow regulation means includes a first return duct face damper extending between said return duct and said input mixing plenum, said first airflow regulation means additionally including a first return duct bypass damper extending between said return duct and said bypass duct;

wherein said first airflow regulation drive includes airflow linkage means closing said return duct bypass damper as said return duct face damper is opened, and a first airflow regulation motor driving said airflow linkage means to open said return duct face damper as a current is applied thereto in a first current direction and to close said return duct face damper as a current is applied thereto opposite said first current direction;

wherein said cooling regulation means includes a valve controlling a rate at which a cooling medium flows into said cooling means;

wherein said cooling regulation drive includes a cooling regulation motor opening said valve as a current is applied thereto in a second direction and closing said valve as a current is applied thereto opposite said a second direction;

wherein said signal of a second type comprises an electrical current flowing in a direction opposite the current flow of said signal of a first type;

wherein said first switching means applies said signal of a first type to said first airflow regulation motor in said first current direction and to said cooling regulation motor in said second current direction; and wherein said second switching means applies said signal of a second type to said first airflow regulation motor opposite said first current direction and to said cooling regulation motor opposite said second current direction.

12. The air conditioning system of claim 1:

wherein said system control means provides a variable control signal, with levels of said control signal in a first range corresponding to low levels of cooling, while levels of said control signal in a second range correspond to higher levels of cooling;

wherein said cooling regulation means includes cooling regulation drive means moved by variations in said control signal within said first range, said cooling regulation drive means being held at a position resulting in a maximum rate of cooling when said control signal is within said second range; and wherein said first airflow regulation means includes first airflow regulation drive means moved by variations in said control signal within said second range, said airflow regulation drive means being held at a position resulting in a minimum flow of air from said return duct into said input mixing plenum as said control signal is within said first range.

13. The air conditioning system of claim 12:

wherein said variable system control signal is a pneumatic signal of varying pressure;

wherein said cooling regulation drive means includes a first pneumatic actuator driven by said control signal, operating against force provided by a cooling regulation spring, said first pneumatic actuator being driven through an actuation stroke as said control signal varied through said first range, said pneumatic actuator being held in a filly actuated position as said control signal is maintained within said second range; and wherein said first airflow regulation means includes a second pneumatic actuator driven by said control signal, operating against force provided by an airflow regulation spring, said second pneumatic actuator being driven through an actuation stroke as said control signal is varied through said second range, said pneumatic actuator being held in an unactuated position as said control signal is maintained within said first range.

14. The air conditioning system of claim 13:

wherein said first airflow regulation means further includes a return duct face damper extending between said return duct and said input mixing plenum, being driven between a fully closed position and a fully open position by said second pneumatic actuator as said second pneumatic actuator is actuated, said first regulation means further including a return duct bypass damper being driven between a fully open position and a fully closed position by said second pneumatic actuator as said second pneumatic actuator is actuated; and wherein said cooling regulation means further includes an input plenum face damper extending between said input mixing plenum and said cooling means, being driven between a fully closed position and a fully open position by said first pneumatic actuator as said first pneumatic actuator is actuated, said cooling regulation means further including an input plenum bypass damper, extending between said input mixing plenum and said return duct, being driven between a fully open position and a fully closed position as said first pneumatic damper is actuated.

15. The air conditioning system of claim 1, comprising in addition means for maintaining a constant rate of airflow through said ventilation duct.

16. An air conditioning system comprising:

a heat exchanger including a cooling medium path, through which a cooling medium is pumped, and a heat exchanger air path through which air is forced;

a return duct extending to a source of air from an indoor space;

a ventilation duct extending to a source of outdoor air;

a supply duct through which air is discharged from said air conditioning system into said indoor space a first air path from said ventilation duct through said heat exchanger air path to said supply duct;

a second air path from said return duct through a bypass duct to said supply duct;

fan means for forcing air through said return, ventilation, and supply ducts, and through said first and second air paths;

a first damper extending between said second air path and said first air path at a first air mixing location between said ventilation duct and said heat exchanger;

a second damper extending across said second air path, to restrict airflow through said second air path while permitting airflow through said first damper;

cooling regulation means controlling a rate at which heat is removed from air moving through said first air mixing location; and system control means for providing a variable overall rate of air cooling, said system control means varying operation of said cooling regulation means to provide relatively low levels of said overall rate of air cooling while holding said first damper closed and said second damper open, said system control means varying said first and second dampers to introduce a flow of air from said return duct into said air mixing location as required to provide relatively high levels of said overall rate of cooling.

17. The air conditioning system of claim 16, comprising in addition refrigeration means for providing said cooling medium within said heat exchanger cooling medium path at a constant temperature.

18. The air conditioning system of claim 17, wherein said refrigeration means includes:

a refrigerant circulation path through which a refrigerant is circulated;

an evaporator having an evaporator coolant path forming a part of a coolant circulating path through which said coolant is circulated, and an evaporator refrigerant path forming a part of said refrigerant circulation path;

compressor means for compressing said refrigerant from said evaporator refrigerant path;

a condenser for cooling said refrigerant compressed by said compressor means;

an expansion nozzle through which said refrigerant is forced into said evaporator; and refrigeration process control means for varying said refrigeration process to maintain a constant temperature of said coolant.

19. The air conditioning system of claim 17 wherein said refrigeration means includes:

a refrigerant circulation path through which a refrigerant is circulated;

an evaporator forming said heat exchanger:

compressor means for compressing said refrigerant from said evaporator;

a condenser for cooling said refrigerant compressed by said compressor means;

an expansion nozzle through which said refrigerant is forced into said evaporator;

refrigerant state measuring means for measuring a physical state of said refrigerant in said evaporator; and refrigeration process control means to control said refrigeration means to maintain a constant physical state of said refrigerant in said evaporator.

20. The air conditioning system of claim 16, wherein said system control means determines a required overall rate of cooling in response to a signal from a thermostat measuring air temperature within said enclosed space.

21. The air conditioning system of claim 16, wherein said cooling regulation means comprises:

a third damper extending between said first air mixing location and said heat exchanger air path;

a fourth damper extending between said first air mixing location and said bypass duct; and damper control means for controlling a rate of airflow through said heat exchanger airpath by operating said third and fourth dampers.

22. The air conditioning system of claim 16, wherein said cooling regulation means comprises means for varying a rate at which said cooling medium flows through said cooling medium path in said heat exchanger.

23. Apparatus for controlling a rate at which a mixture of outdoor air from a ventilation duct and indoor air from a return duct is cooled by cooling means within an air conditioning system, and for enhancing the dehumidification of said outdoor air, said apparatus operating in response to signals from system control means indicating that an overall rate of cooling should be increased or decreased, said apparatus comprising:

an input mixing plenum between said ventilation duct and said cooling means;

a bypass duct extending around said cooling means from said return duct;

a first damper extending between said return duct and said input mixing plenum;

a second damper extending between said return duct and said bypass duct;

fan means for forcing air through said cooling means and through said bypass duct;

an output mixing plenum having a first input from said cooling means and a second input from said bypass duct;

cooling regulation means for controlling a cooling rate at which cooling occurs within said cooling means, said cooling regulation means being driven in a first direction to increase said cooling rate as a signal of a first type from said system control means is applied to a cooling regulation motor, said cooling regulation means being driven opposite said first direction to decrease said cooling rate as a signal of a second type from said system control means is applied to said cooling regulation motor;

return damper drive means for operating said first and second dampers, said return damper drive means being driven in a direction to open said first damper and to close said second damper as said signal of a first type is applied to a return damper motor, said return damper drive means being driven in a direction to close said first damper and to open said second damper as said signal of a second type is applied to said return damper motor;

first switching means applying said signal of a first type to said return damper motor when said cooling regulation drive is in a position maximizing said cooling rate, said first switching means applying said signal of a first type to said cooling regulation motor when said cooling regulation drive is not in said position maximizing said cooling rate; and second switching means applying said signal of a second type to said cooling regulation motor when said return damper drive means is in a position fully closing said first damper, said second switching means applying said signal of a second type to said return damper motor when said return drive motor is not in said position fully closing said first damper.

24. The apparatus of claim 23, wherein said cooling regulation means comprises a third damper, extending between said input mixing plenum and said cooling means, and a fourth damper extending between said input mixing plenum and said bypass duct, said third damper being opened while said fourth damper is closed as said signal of a first type is applied to said cooling regulation motor, said third damper being opened while said fourth damper is closed as said signal of a second type is applied to said cooling regulation motor.

25. The apparatus of claim 23, wherein said cooling regulation means comprise s a valve controlling a rate at which coolant flows through said cooling means, said valve being opened as said signal of a first type is applied to said cooling regulation motor and closed as said signal of a second type is applied to said cooling regulation motor.

26. Apparatus for controlling a rate at which a mixture of outdoor air from a ventilation duct and indoor air from a return duct is cooled by cooling means within an air conditioning system, and for enhancing the dehumidification of said outdoor air, said apparatus operating in response to a control signal from system control means indicating a level of an overall rate of cooling, said apparatus comprising:
- an input mixing plenum between said ventilation duct and said cooling means;
- a bypass duct extending around said cooling means from said return duct;
- a first damper extending between said return duct and said input mixing plenum;
- a second damper extending between said return duct and said bypass duct;
- fan means for forcing air through said cooling means and through said bypass duct;
- an output mixing plenum having a first input from said cooling means and a second input from said bypass duct;
- cooling regulation means for controlling a cooling rate at which cooling occurs within said cooling means, said cooling regulation means operating to increase said cooling rate as said control signal increases in intensity within a first range, said cooling regulation means operating to decrease said cooling rate as said control signal decreases in intensity within said first range;
- return damper drive means for operating said first and second dampers, said return damper drive means being driven in a direction to open said first damper and to close said second damper as said control signal increases in intensity within a second range, said return damper drive means operating to close said first damper and to open said second damper as said control signal decreases intensity within said second range, said second range including higher levels of intensity of said control signal than said first range.

27. The apparatus of claim 26:
wherein said control signal is a pneumatic signal;
wherein said cooling regulation means includes a cooling regulation pneumatic cylinder to which said control signal is applied, said cooling regulation pneumatic cylinder applying a force against a cooling regulation spring allowing motion of said cooling regulation pneumatic cylinder through a full stroke as said control signal is varied within said first range; and
wherein said return damper drive means includes a return damper pneumatic cylinder to which said control signal is applied, said return damper pneumatic cylinder applying a force against a return damper regulation spring allowing motion of said return damper pneumatic cylinder through a full stroke as said control signal is varied within said second range, said first damper being opened and said second damper being closed as said return damper pneumatic cylinder applies additional force to said return damper regulation spring, said first damper being closed and said second damper being opened as said return damper pneumatic cylinder applies decreasing force to said return damper regulation spring.

28. The apparatus of claim 26, wherein said cooling regulation means comprises a third damper, extending between said input mixing plenum and said cooling means, and a fourth damper extending between said input mixing plenum and said bypass duct, said third damper being opened and said fourth damper being closed as said cooling regulation pneumatic cylinder moves in applying additional force to said cooling regulation spring, said third damper being closed and said fourth damper being opened as said cooling regulation damper moves in applying decreased force to said cooling regulation spring.

* * * * *